Oct. 14, 1958     F. S. ALLINQUANT     2,856,197
COUPLING DEVICE FOR THE LOWER EXTREMITY
OF AN AXIAL AUTOMOBILE SUSPENSION

Filed Oct. 7, 1955     3 Sheets-Sheet 1

Oct. 14, 1958

F. S. ALLINQUANT 2,856,197

COUPLING DEVICE FOR THE LOWER EXTREMITY
OF AN AXIAL AUTOMOBILE SUSPENSION

Filed Oct. 7, 1955

United States Patent Office 2,856,197
Patented Oct. 14, 1958

2,856,197

COUPLING DEVICE FOR THE LOWER EXTREMITY OF AN AXIAL AUTOMOBILE SUSPENSION

Fernand Stanislas Allinquant, Paris, France

Application October 7, 1955, Serial No. 539,246

Claims priority, application France October 8, 1954

5 Claims. (Cl. 280—96.2)

In a suspended vehicle, the movement of the member of the chassis to which an axial suspension device is attached is not one of pure translation with respect to the point of fixation of the said device to the body. It is for that reason that a pivotal joint is usually provided at at least one of the points of attachment.

It is true that this is not absolutely necessary if the suspension device is of the helicoidal spring type, in view of the lateral flexibility of a member of this kind. However, as all distortion results in a corresponding fatigue, a careful construction would provide, even in this case, a pivotal joint at least along an axis parallel to that of the carrying arms which are coupled to the axle.

A pivotal joint is essential on the other hand, whenever the suspension device does not have lateral flexibility and would not be capable, by reason of its nature, even if a special assembly of the members coupled to the axle permitted this, to impose on these members a displacement which is strictly rectilinear. This is the case of a telescopic suspension device. In this case, it is thus necessary to provide an articulation at one of the points of fixation, and this articulation should have two perpendicular axes or it should be universal in movement, since the apparatus does not tolerate errors of alignment, even of the small amplitude of those which correspond to a relative displacement parallel to the pivotal axis of the supporting arm which is coupled to the axle. In this case therefore, there has been provided either a cardan coupling with trunnions, or a swivel joint.

These standard solutions have however the drawback of being relatively costly to construct, of being bulky, of requiring maintenance, and especially of having appreciable friction. This friction gives rise to a resistive torque in the pivotal joint, and this torque gives rise to lateral stresses on the member which couples together the suspended parts. Where a telescopic device is in question, such lateral stresses are an additional cause of wear on the sliding members, and in particular they may give rise to leakages of damping or suspension fluid.

This risk is perhaps not very great in the case of a hydraulic shock absorber associated with a separate suspension, since this shock absorber is only subjected to the reactions due to the effect of damping of the movements of the suspension, and not directly to the much greater stresses which correspond to the weight of the body and to its live force. This is not the case when the telescopic device which effects the damping is at the same time a suspension member, that is to say when it is an apparatus of damped suspension. In this case, in fact, the thrusts which may be applied to the points of attachment are of the order of one ton, and the lateral stresses referred to above may be so large that they interfere with correct operation.

The present invention has for its object a coupling device for the lower extremity of an axial suspension for automobiles, and in particular of a damped suspension device which costs little to construct, is of small bulk and functions with negligible friction.

The coupling device in accordance with the invention comprises an articulated supporting coupling including, at least along the axis of the oscillations of greatest amplitude, a knife edge supported against a plate, these two members being respectively fixed to the suspension device and to its attachment member, and a retaining coupling member for the knife edge supported against its plate, the said coupling comprising two abutments, one being fixed to the suspension device and the other to the attachment member, with the interposition of a deformable elastic member.

When the coupling device is provided with two knife edges for permitting of pivotal movement about two axes at right angles, the knife edges are respectively parallel to the axes, they are opposed by their edges and the latter are in the same plane, the plates of these knife edges being constituted by one intermediate member which is preferably cut away at its centre in the vicinity of the point of intersection of the said edges. For articulation about the axis around which the oscillations of the smallest amplitude take place, the device may be provided with a journal bearing of elastic material instead of a knife edge, the base of the knife edge or the back of the plate of the pivotal movement in the direction at right angles to the first being supported on the said bearing.

In accordance with a further feature of the invention, the elastic retaining abutment for the pivoted supporting members is located in the plane of the pivotal axes, and the device comprises a conical sleeve which is retained by an external flange against the back face of the attachment member, and which retains through an internal small collar, a rubber ring against which a spacing tube is in abutment, the tube being clamped by means of a nut on the attachment rod of the suspension device, these members being located in a hollowed-out central portion of the knife edges and of the plate, with a lateral play which is sufficient to permit the oscillation. The device is preferably enclosed in a deformable oscillating casing forming a closed space between the suspension device and the attachment member.

The invention will be described with reference to two forms of embodiment given by way of example and illustrated in the drawings which are attached to the present description, and in which.

Figure 2:
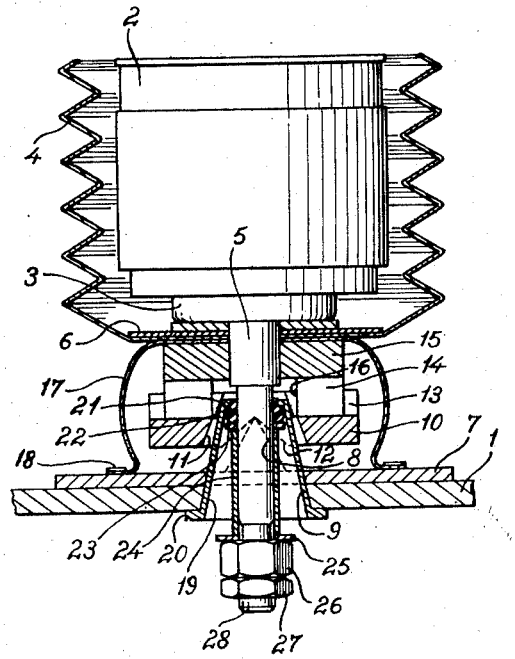
Fig. 2 is a similar view shown in elevation and partial section taken, approximately along the line 2—2 in Fig. 1.
Figure 3:
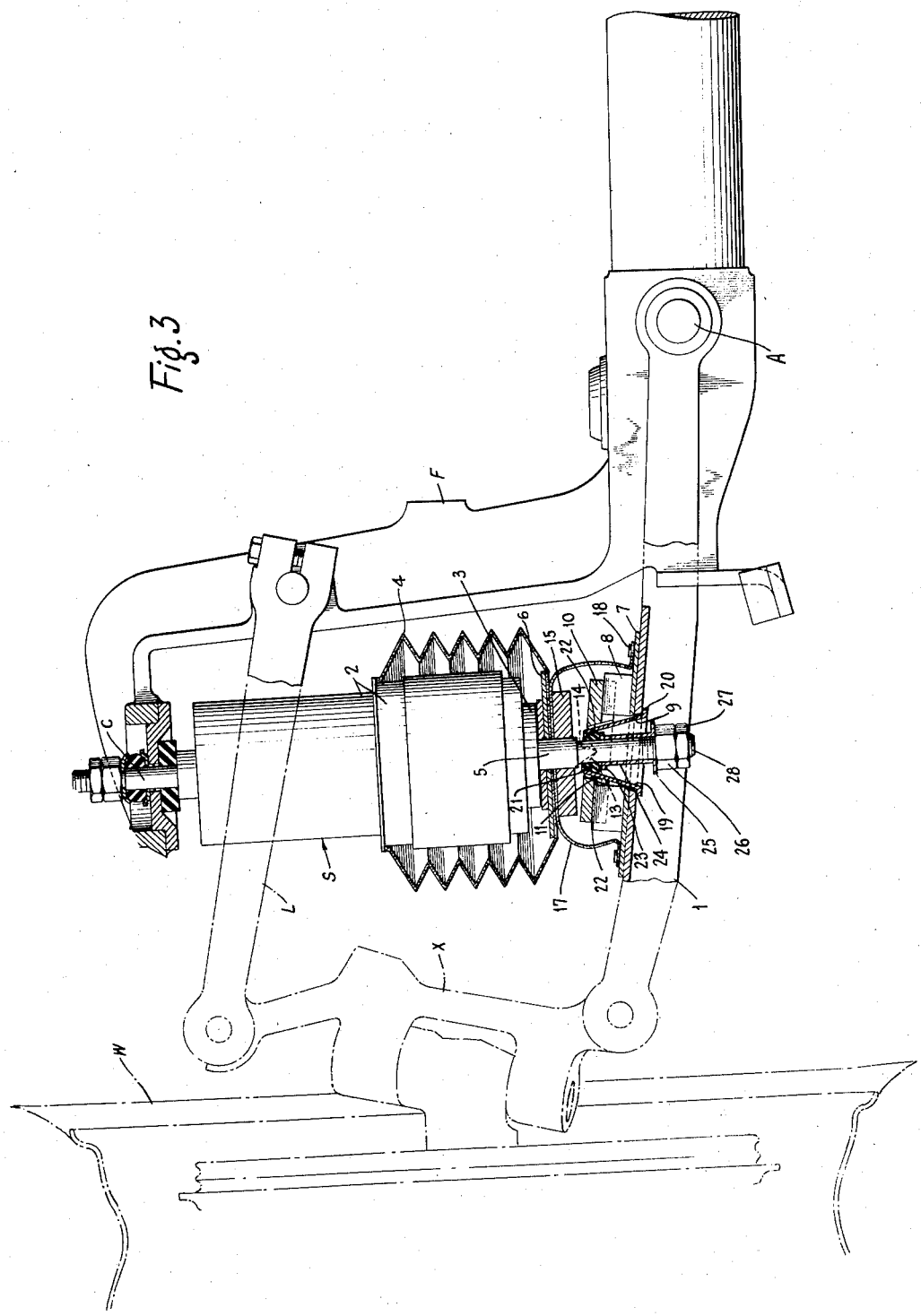
Fig. 3 is a schematic elevation showing a coupling device in accordance with the invention installed on a car, parts being shown in vertical section.

The device which forms the object of the invention is shown in Fig. 3 of the drawings as applied to the coupling between a pivoted arm 1 of a vehicle wheel suspension and the lower end of an elastic, damped, telescopic suspension device S comprising a cylinder 2 and piston 3. At its inner end the arm 1 is pivotally connected to a frame member F of the vehicle to swing about an oscillation axis A. At its outer end the arm 1 is pivotally connected to the lower portion of an axle member X for a wheel W. A second arm L is pivotally connected between an upper portion of the axle member X and the frame F. The upper end of the cylinder 2 is connected to a portion of the frame F, by a coupling C. The lower end of the piston 3 is connected to the wheel supporting arm 1 by a coupling device in accordance with the invention as shown in more detail in Figs. 1 and 2. In these figures, there has only been shown diagrammatically the lower extremity of the cylinder 2 and the piston 3 which slides inside the said cylinder, and a bellows casing 4 which couples the cylinder to the lower end of the piston in order to enclose and protect the sliding joint between the cylinder and piston. The piston 3 is extended axially by a stem or rod 5 which is provided at its base with a washer 6 for supporting it against the bottom of the bellows casing 4.

Figure 1:
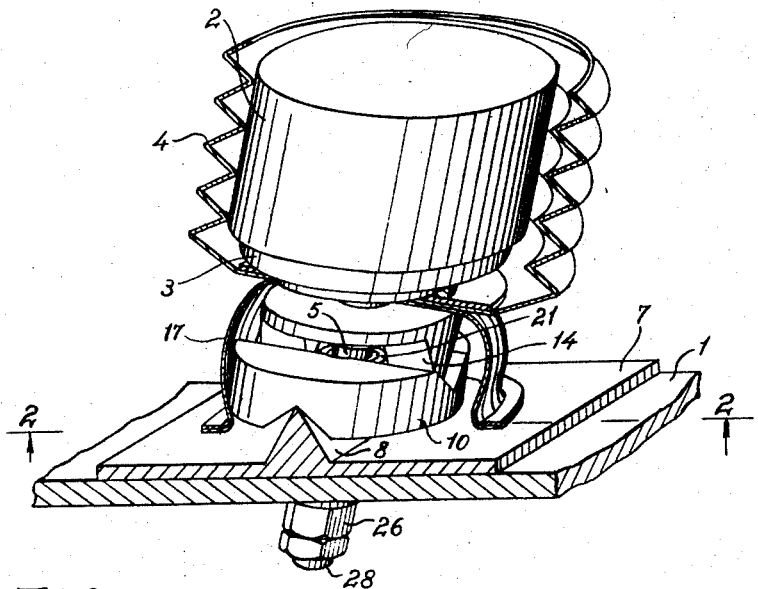
Fig. 1 is a perspective view of an articulated device in accordance with the invention with two knife edges shown with a damped telescopic suspension device in an inclined position with respect to the edges of the pivot blades.

The coupling device forming the object of the present invention ensures the pivotal attachment of the rod 5 of the piston to the wheel supporting member 1. In the form of construction which is shown in Figs. 1 and 2, the pivotal movement takes place along two axes at right angles to each other, one being parallel to the pivotal axis A of the arm forming the wheel supporting member 1, and the other at right angles thereto. These two pivotal mountings are of the knife-edge type. On the wheel supporting member 1 is laid and fixed by any particular known means, a plate 7 which carries on its upper side a knife-edge 8 in such a position that the edge of the blade is parallel to the pivotal axis of the arm 1. This knife-edge is cut along its length in two portions by removal of the central part so as to provide a frusto-conical hole 9 formed in the wheel supporting member 1 and the plate 7. On the edge of the blade 8 is supported a plate 10 of circular form which is provided at its centre with a frusto-conical hole 11, having a greater angle than that previously mentioned and formed with a diametral V-shaped groove 12 on its lower face, the said groove having an angle greater than that of the knife-edge so as to leave on each side the clearance required for the maximum inclination provided for the arm 1 on the axis of the suspension device.

The upper face of the plate 10 is cut in a similar manner but following a direction at right angles to that preceding, with a V-shaped groove 13, the bottom of which is in the same plane as the bottom of the groove 12 on the lower face. In the upper groove 13 is engaged the edge of a blade 14 formed on the lower face of a circular bearing member 15 which is centered on the rod 5 and supported against the members of the suspension which are coupled to the said rod. The knife-edge 14 is divided, in the same way as the knife-edge 8, into two parts by a central opening 16 in the bearing member 15. Its angle is less than that of the V-shaped slot 13 by an amount sufficient to permit of the transverse oscillation for which the device is designed.

The unit formed by the knife-edges 8 and 14 and their common plate 10 is protected from the exterior by a flexible casing 17, the base of which is gripped between the member 15 and the bellows casing 4 and the lower edge of which is fixed to the plate 7 of the lower knife-edge by means of a washer 18. This casing 17 forms a closed space around the knife-edges, which may be filled with grease.

The two knife-edges 8 and 14 constitute two pivotal axes which provide a universal articulation of the suspension device, but it is an articulated support; in other words, the knife-edges only remain in contact with their plate, and the pivotal movement only takes place correctly if the articulated device applies a thrust to its attachment member. This is the case as long as the weight of the automobile body rests on the wheel. Means are also provided for keeping the members of the articulated system in position when the weight of the automobile body no longer rests on the wheels.

In the frusto-conical hole 9 in the arm 1 and the plate 7, is engaged a hollow frusto-conical sleeve 19 which is retained in its upward movement by an external collar or flange 20 which is supported against the lower face of the arm 1. This frusto-conical sleeve extends up through the central hole 11 of the plate 10 between the two parts of the knife-edges 8 and 14, and terminates slightly above the plane of the edges of the blades in an internal collar or flange 21. Under this flange is applied a ring-shaped washer of rubber 22, in such manner that its mean plane at rest coincides with the plane of the edges of the knives, by the supporting action of an abutment shown as an external end-flange 23 of a spacing tube 24 engaged on the rod 5 and retained in position by a washer 25, a nut 26 and a lock-nut 27 screwed on the threaded end 28 of the rod 5, a suitable clamping force being used to place the ring-shaped washer 22 in slight compression.

In operation, the knife-edges 8 and 14 permit a relative oscillation of the suspension device, and this oscillation is not hindered by the presence of the flexible joint formed by the toric washer 22 which is interposed between the frusto-conical sleeve member 19 fixed rigidly to the arm and the spacing tube 24 rigidly fixed to the suspension device. The internal frusto-conical space 11 formed in the plate 10 has an opening large enough to permit the maximum oscillations of the plate with respect to the frusto-conical sleeve member 19. It can be seen that the device provides a pivotal movement practically without friction, and that in consequence no appreciable lateral stress can act in opposition to the normal movement of the piston of the suspension device during the relative movements of oscillation of this latter.

In addition, it will be appreciated that the coupling device described is simple in construction and very easy to assemble. For this assembly, the rod 5 is engaged in the casing 17, the member 15 of the upper knife-edge 14 and the plate 10, and the said rod is introduced through the hole 9 formed in the plate 7 of the lower knife-edge 8 and through the arm 1 until the plate 10 is resting on the lower knife-edge 8. The frusto-conical sleeve member 19, the toric ring 22 and the spacing tube 24 are then introduced underneath the arm 1, and the washer and nuts are placed in position so as to ensure the retention of the rod 5 as a support for the pivot edges. The casing 17 can then be filled with grease and it is fixed along its periphery.

Figure 4:
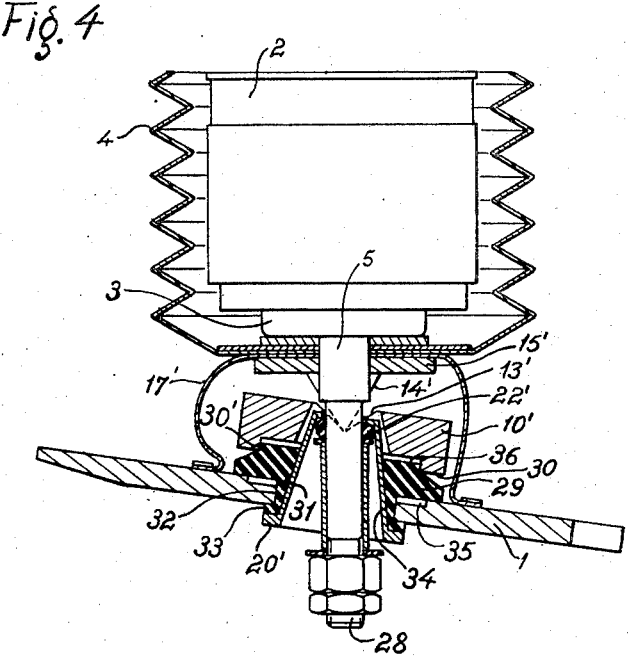
Fig. 4 is a sectional view similar to that of Fig. 2, of a further form of construction of the device, which only comprises one knife-edge, this view being taken at right angles to the axis of the knife-edge and the suspension device being shown inclined about the knife-edge.
Figure 5:
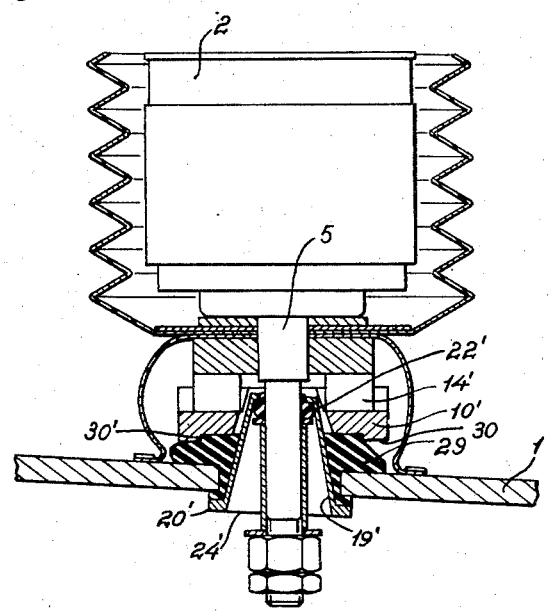
Fig. 5 is a sectional view similar to that shown in Fig. 4 but taken in a plane perpendicular thereto.

In Figs. 4 and 5 there is shown another embodiment which is similar to that of Figs. 1 and 2 except that it utilizes only one knife edge instead of two. The articulated bearing structure accordingly comprises a plate 10' and a bearing member 15' having a knife edge 14' which is parallel to the pivotal axis A of the wheel supporting arm 1 and bears in a groove 13' in the upper face the plate 10', which is supported on a fairly thick annular pad of rubber 29. The plate is centered on this pad by a circular rim 30, which is mounted as a cap on a boss 30' formed on the pad. The rubber pad extends downwards in the form of a collar 31 which passes into a circular hole 32 formed in the arm 1, and which is retained by an external flange 33 supported against the lower face of the arm, the engagement being made possible by reason of the deformable nature of the rubber. The frusto-conical sleeve member 19' is adjusted in a frusto-conical passage in the rubber block and its flange 20' is supported against the flange 33 of this latter. Radial ribs 35 and 36 are respectively engaged in corresponding grooves formed in the arm 1 and the plate 10', and these prevent relative rotation of these members, thus retaining the knife-edge in the correct direction. As in the previous case, a ring shaped rubber washer 22' is interposed between the base of the frusto-conical sleeve member 19' and a spacing-tube 24' retained by the nuts on the threaded portion of the rod 5. The whole is encased as in the previous embodiment, by a deformable casing 17'.

It will be seen that, as in the previous case, the pivotal action along an axis parallel to the axis of articulation of the arm is effected by a knife-edge (the knife-edge 14')

since it is this which corresponds to the movement having the greatest amplitude (see Fig. 4). In the direction at right angles, the possible movements of low amplitude are taken up by a deformation of the rubber block 29, which is flattened on one side so as to permit of deformation (see Fig. 5). The result is roughly the same as in the preceding case. The couple which can be produced by the compression of the rubber is always fairly small since the transverse movements at the arm are of small amplitude.

It will be quite obvious that the form of embodiment which has just been described, in which the pivotal movement is only effected by knife-edge along the axis of the oscillations of large amplitude, may be given a large number of alternative forms. It will first be observed that the relative positions of the knife-edge and its plate may be reversed. In addition, in order to ensure the necessary freedom in the vertical plane of oscillation, there may be used as a support for one of these elements, any known elastic device which permits of a longitudinal inclination of a few degrees in any direction of the contact edge of the blade with respect to its normal position. The resulting couple will remain small enough not to give rise to troublesome lateral stresses on the sliding members of the suspension device.

It will of course be understood that the invention is not limited to the application considered and the device may be used for any other kind of suspension member than that which has actually been described. It is not quite so well adapted to the coupling of a simple shock-absorber combined with a separate suspension member, since the tensile and compression stresses are then of the same order of magnitude, but this application is not excluded.

What I claim is:

1. A coupling device between a wheel supporting member connected to an automobile frame through an oscillation axis and the lower extremity of an axial suspension between said frame and said member comprising, in combination a plate secured on said member and formed with an upper knife-edge directed parallel to said axis and with a circular flaring hole extending through said member, a circular plate formed with a central aperture and cut on each face with a diametrically shaped groove, said grooves being perpendicular to each other and having their basal edges in the same plane, said knife-edge being engaged in the lower of said grooves, a plate engaging said lower extremity of said axial suspension and formed with a central aperture and on its lower face with a knife-edge directed perpendicular to said axis and engaging the upper of said grooves, a rod extending from said axial suspension through said apertures and hole, a conical sleeve formed at its lower end of greater diameter with an external collar abutted under said member, extending through said hole and central aperture around said rod up to the common level of both of said knife-edges and formed with an inner collar, a distance-tube engaged on said rod up to a distance from said inner collar, a nut screwed on said rod and abutting said distance-tube, a rubber ring between said inner collar and said distance-tube, and a deformable casing between said axial suspension and said member.

2. A coupling device between a wheel supporting member connected to an automobile frame through an oscillating axis and the lower extremity of an axial suspension between said frame and said member, comprising in combination, an annular pad with an upwardly tapering conical bore, having a boss on its upper face and an annular extension on its lower face fitting through a circular hole in said member and formed with an external collar engaging the lower face of said member, a plate having a central aperture, a diametrical V-shaped groove cut in its upper face and a circular recess in its lower face engaged by said boss, said pad being formed with radial ribs on both its faces engaging recesses in said member and in said plate so as to direct said groove parallel to said axis, a plate engaging said lower extremity of said axial suspension and formed with a central aperture and on its lower face with a knife-edge engaging said groove, a rod extension from said axial suspension through said aperture and said bore, a conical sleeve around said rod, fitting in said bore, formed with an external collar engaging the external collar of said pad, extending up to the level of said knife-edge and formed with an inner collar, a distance-tube engaged on said rod up to a distance from said inner collar, a nut screwed on said rod and abutting said distance tube, a rubber ring between said inner collar and said distance-tube, and a deformable casing between said axial suspension and said member.

3. A coupling device between a wheel supporting member connected to an automobile frame through an oscillation axis and the lower extremity of an axial suspension between said frame and member, said coupling device comprising, in combination, an articulated bearing structure interposed between said lower extremity of the axial suspension and said member, including at least a superposed bearing member and bearing plate assembly having aligned central apertures, said bearing member having a knife-edge bearing on said plate and extending diametrically with respect to said apertures and parallel to said oscillation axis, a rod extending from said axial suspension through said apertures and through a circular hole in said supporting member, a conical sleeve formed at its lower end of greater diameter with an external collar abutted under said member, extending through said hole and said apertures and around said rod up to the level of said knife-edge and formed with an inner collar at approximately said level, an abutment clamped on said rod under and spaced from said inner collar, an annular elastic cushion means interposed between said inner collar and said abutment, and a deformable casing between said axial suspension and said member and enclosing said articular bearing structure.

4. A coupling device according to claim 3, in which said articulated bearing structure further comprises a second bearing member having a central hole receiving said rod and a knife-edge bearing on the opposite side of said plate and directed perpendicular to said oscillation axis.

5. A coupling according to claim 3, in which said articulated bearing structure further comprises an annular pad of elastic material surrounding said sleeve and in superposed relationship with said bearing member and bearing plate assembly.

References Cited in the file of this patent

UNITED STATES PATENTS

| 2,574,788 | Janeway et al. | Nov. 13, 1951 |
| 2,693,372 | Ludwig et al. | Nov. 2, 1954 |

FOREIGN PATENTS

| 121,054 | Australia | Feb. 18, 1946 |
| 939,528 | France | Apr. 26, 1948 |
| 731,277 | Germany | Feb. 5, 1943 |
| 3,676 | Great Britain | of 1869 |